(12) United States Patent
Yamazaki et al.

(10) Patent No.: US 9,133,877 B2
(45) Date of Patent: Sep. 15, 2015

(54) ROLLING ELEMENT ACCOMMODATING TOOL

(71) Applicant: Nippon Bearing Co., Ltd., Ojiya-shi, Niigata (JP)

(72) Inventors: Toru Yamazaki, Ojiya (JP); Yusuke Ueki, Ojiya (JP)

(73) Assignee: Nippon Bearing Co., Ltd., Ojiya-shi (JP)

( * ) Notice: Subject to any disclaimer, the term of this patent is extended or adjusted under 35 U.S.C. 154(b) by 0 days.

(21) Appl. No.: 14/169,705

(22) Filed: Jan. 31, 2014

(65) Prior Publication Data

US 2014/0241652 A1 Aug. 28, 2014

(30) Foreign Application Priority Data

Feb. 28, 2013 (JP) ................................. 2013-039904

(51) Int. Cl.
*F16C 29/06* (2006.01)
*F16C 33/46* (2006.01)
(Continued)

(52) U.S. Cl.
CPC ............. *F16C 29/0607* (2013.01); *F16C 29/06* (2013.01); *F16C 33/3825* (2013.01); *F16C 33/3831* (2013.01); *F16C 33/4611* (2013.01); *F16C 33/506* (2013.01)

(58) Field of Classification Search
CPC ............. F16C 33/3812; F16C 33/3825; F16C 33/506; F16C 33/508
USPC .................................. 384/43–45, 49, 51, 523
See application file for complete search history.

(56) References Cited

U.S. PATENT DOCUMENTS

| 8,764,302 B2* | 7/2014 | Masumura et al. ........... 384/527 |
| 2004/0057640 A1* | 3/2004 | Michioka et al. ............... 384/43 |

FOREIGN PATENT DOCUMENTS

| DE | 91164 A1 | 7/1972 |
| EP | 1498246 A1 | 1/2005 |

(Continued)

OTHER PUBLICATIONS

Extended European Search Report issued Jun. 11, 2014 in counterpart European Appln No. EP14152629.

(Continued)

*Primary Examiner* — Phillip A Johnson
(74) *Attorney, Agent, or Firm* — Novak Druce Connolly Bove + Quigg LLP

(57) ABSTRACT

Provided is a practical rolling element accommodating tool that engages firmly with a reinforcing material without compromising flexibility, wherein tension strength of the reinforcing material is sufficiently exhibited. A rolling element accommodating tool for rotatably accommodating a plurality of rolling elements (4) at predetermined intervals is placed along an endless circulation path (5) along which the rolling elements (4) circulate in a linear motion device (1) provided with the endless circulation path (5) and comprising a rail element (2) and a linear moving element (3) that moves linearly relative to the rail element (2); wherein the rolling element accommodating tool has a main body configured from spacers (6) individually provided between adjacent rolling elements (4), and connecting parts (7) oriented in a direction orthogonal to the direction in which the spacers (6) are aligned, protruding on both sides of the rolling elements (4) in a state of accommodating the rolling elements (4), and serially connecting the spacers; reinforcing films (9) having the same length in the longitudinal direction as the connecting parts (7) being contained within the connecting parts (7); and the reinforcing films (9) being formed at large widths in predetermined positions.

10 Claims, 3 Drawing Sheets

(51) Int. Cl.
   *F16C 33/38* (2006.01)
   *F16C 33/50* (2006.01)

(56) References Cited

FOREIGN PATENT DOCUMENTS

| EP | 2476925 | A1 | 7/2012 |
| FR | 1601444 | A | 8/1970 |
| GB | 1059698 | A | 2/1967 |
| GB | 1314676 | A | 4/1973 |
| JP | S6290226 | A | 4/1987 |
| JP | 2001-065565 | A | 3/2001 |
| JP | P2001-074048 | A | 3/2001 |
| JP | 2005003195 | A * | 1/2005 |
| JP | 2010-280215 | A | 12/2010 |

OTHER PUBLICATIONS

Office Action issued Apr. 9, 2015 in Japanese Appln 2013-039904.

\* cited by examiner

ROLLING ELEMENT ACCOMMODATING TOOL

CROSS REFERENCE TO RELATED APPLICATIONS

This application claims priority to Application No. 2013-039904 filed in Japan on Feb. 28, 2013 under 35 U.S.C. §119, the entire contents of which is hereby incorporated by reference.

BACKGROUND OF THE INVENTION

1. Field of the Invention

The present invention relates to a rolling element accommodating tool.

2. Description of the Related Art

In a linear motion device comprising a rail and a block that moves linearly relative to the rail, and provided with an endless circulation path through which a rolling element (a ball) circulates, the block is moved relative to the rail via a plurality of rolling elements circulating through the endless circulation path while rolling.

In such a linear motion device, adjacent rolling elements chafe against each other along with the movement of the block, inhibiting smooth rolling and causing noise. Rolling element accommodating belts have therefore been used in conventional practice to align the rolling elements in the direction of arrangement within the endless circulation path.

Various rolling element accommodating belts of such description have been proposed; for example, there are those containing a reinforcing material to improve tension strength (see Japanese Laid-open Patent Application No. 2001-74048).

When a filler (comprising short fibers) is admixed as the reinforcing material, belt wear causes the filler to leak out, and it is possible that the longevity of the linear motion device could be compromised.

When long fibers such as carbon or glass are embedded, there are no such problems with leaking, but effective reinforcing is not accomplished and sufficient tension strength is not yet achieved.

Specifically, when conventional long fibers are used as a reinforcing material, the binding force between the long fibers and the resin (base material) depends on the adhesive force at the interface between the long fibers and the resin. Therefore, there have been problems with the resin peeling away from the long fibers before the long fibers exhibit their tension strength when tension is applied.

In view of this, techniques have been proposed for making the cross-sectional shape of the long fibers polygonal, for example, to increase the contact surface area between the long fibers and the resin, but there is no difference in the sense that the cross-sectional area virtually does not change in the longitudinal direction and the binding force remains dependent on the adhesive force of the interface between the long fibers and the resin, and the fact is that the problems described above have not been resolved.

When long fibers of great tension strength are used, another problem encountered is that excessive bending strength affects the smoothness of the linear guiding motion.

SUMMARY OF THE INVENTION

The present invention, which is intended to resolve problems such as those described above, provides a practical rolling element accommodating tool in which the main body is provided with reinforcing films that are provided with concavities and convexities in the longitudinal direction and that change in cross-sectional area in the longitudinal direction due to being formed at large widths in predetermined positions, whereby the main body and the reinforcing material are firmly engaged together without compromising flexibility, and tension strength of the reinforcing film is sufficiently exhibited.

A summary of the present invention is described with reference to the accompanying drawings.

The present invention relates to a rolling element accommodating tool for rotatably accommodating a plurality of rolling elements 4 at predetermined intervals, the rolling element accommodating tool being placed along an endless circulation path 5 along which the rolling elements 4 circulate in a linear motion device 1 provided with the endless circulation path 5 and comprising a rail element 2 and a linear moving element 3 that moves linearly relative to the rail element 2; wherein the rolling element accommodating tool has a main body configured from spacers 6 individually provided between adjacent rolling elements 4, and connecting parts 7 oriented in a direction orthogonal to the direction in which the spacers 6 are aligned, protruding on both sides of the rolling elements 4 in a state of accommodating the rolling elements 4, and serially connecting the spacers; reinforcing films 9 having the same length in the longitudinal direction as the connecting parts 7 being contained within the connecting parts 7; and the reinforcing films 9 being formed at large widths in predetermined positions.

The present invention also relates to a rolling element accommodating tool which is the rolling element accommodating tool according to the first aspect, wherein the predetermined positions are the positions of the spacers 6 in the longitudinal direction of the main body.

The present invention also relates to a rolling element accommodating tool which is the rolling element accommodating tool according to the second aspect, wherein the reinforcing films 9 are configured so as to be in proximity to or in contact with the spacers 6 in the positions of the spacers 6.

The present invention also relates to a rolling element accommodating tool which is the rolling element accommodating tool according to the first aspect, wherein the main body and the reinforcing films 9 are made of a synthetic resin, and the main body and the reinforcing films 9 are integrated by insert molding.

The present invention also relates to a rolling element accommodating tool which is the rolling element accommodating tool according to the second aspect, wherein the main body and the reinforcing films 9 are made of a synthetic resin, and the main body and the reinforcing films 9 being integrated by insert molding.

The present invention also relates to a rolling element accommodating tool which is the rolling element accommodating tool according to the third aspect, wherein the main body and the reinforcing films 9 are made of a synthetic resin, and the main body and the reinforcing films 9 are integrated by insert molding.

The present invention also relates to a rolling element accommodating tool which is the rolling element accommodating tool according to the first through sixth aspects, wherein the materials used for the main body and the reinforcing films 9 are similar materials.

The present invention also relates to a rolling element accommodating tool which is the rolling element accommodating tool according to the first through sixth aspects, wherein the reinforcing films 9 are stretched films 9 that are stretched at least in the longitudinal direction, and are contained within the main body so that the longitudinal direction of the stretched films 9 is the longitudinal direction of the main body.

The present invention also relates to a rolling element accommodating tool which is the rolling element accommodating tool according to the seventh aspect, wherein the reinforcing films 9 are stretched films 9 that are stretched at least in the longitudinal direction, and are contained within the main body so that the longitudinal direction of the stretched films 9 is the longitudinal direction of the main body.

The present invention also relates to a rolling element accommodating tool which is the rolling element accommodating tool according to the first through sixth aspects, wherein the reinforcing films 9 are provided so that the planar direction thereof is parallel with the protruding direction of the connecting parts 7.

The present invention also relates to a rolling element accommodating tool which is the rolling element accommodating tool according to the first through sixth aspects, wherein the ratio d1/d2 of the minimum value d1 to the maximum value d2 of the intervals between opposing inner edges of the reinforcing films 9 is 0.85 or less.

The present invention also relates to a rolling element accommodating tool which is the rolling element accommodating tool according to the first through sixth aspects, wherein the inner edges 11 of the connecting parts 7 are established as shapes that curve along the shapes of the outer edges of the accommodated rolling elements 4, and the inner edges 12 of the reinforcing films 9 are established as shapes that curve along the inner edges of the connecting parts 7.

Effects of the Invention

The present invention, being configured as described above, is a practical rolling element accommodating tool that engages firmly with a reinforcing material without compromising flexibility, wherein tension strength of the reinforcing material itself is sufficiently exhibited.

DESCRIPTION OF THE PREFERRED EMBODIMENTS

Figure 1:
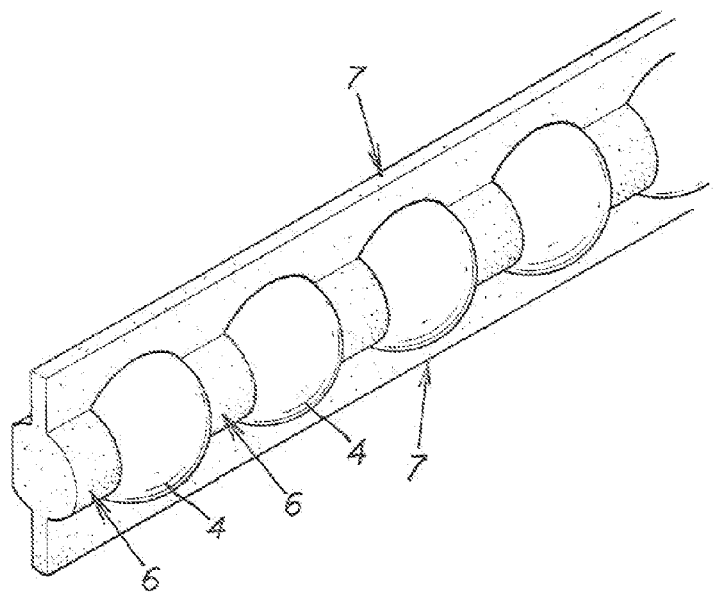
FIG. 1 is a schematic explanatory perspective view of the present example.

Preferred embodiments of the present invention are described in a simple manner based on the drawings, with depiction of the effects of the present invention.

Rolling elements 4 are accommodated between spacers 6, and are placed in an endless circulation path 5 of a linear motion device 1 to smoothly conduct the linear movement of a linear moving element 3. Because reinforcing films 9 are at large widths formed in predetermined positions and concavities and convexities are thereby formed in the longitudinal direction, the reinforcing films 9 and the main body firmly engage and the main body is consequently prevented from peeling away from the reinforcing films 9 even when the main body is subjected to tension. Specifically, the tension strength of the reinforcing films 9 is exhibited satisfactorily, and tearing of the main body can be satisfactorily prevented.

This is due to the fact that the binding force between the main body and the reinforcing films 9 does not depend on the adhesive force at the interface between the main body (the resin) and the reinforcing films 9, the cross-sectional area of the reinforcing films 9 changes in the longitudinal direction, and the main body and the reinforcing films 9 are bonded together by a physically engaged relationship.

Because the reinforcing films 9 curve satisfactorily in a planar direction, the reinforcing film can be made to curve satisfactorily along the endless circulation path 5 even if a material of great tension strength is used, and smooth linear guiding is made possible.

Examples

Specific examples of the present invention are described based on the drawings.

The present example is a belt-shaped rolling element accommodating tool (rolling element accommodating belt) for rotatably accommodating a plurality of rolling elements 4 at predetermined intervals, the rolling element accommodating tool being placed along an endless circulation path 5 along which the rolling elements 4 circulate in a linear motion device 1 provided with the endless circulation path 5 and comprising a rail element 2 and a linear moving element 3 that moves linearly relative to the rail element 2; wherein the rolling element accommodating tool has a main body configured from spacers 6 individually provided between adjacent rolling elements 4, and connecting parts 7 oriented in a direction orthogonal to the direction in which the spacers 6 are aligned, protruding on both sides of the rolling elements 4 in a state of accommodating the rolling elements 4, and serially connecting the spacers; reinforcing films 9 having the same length in the longitudinal direction as the connecting parts 7 being contained within the connecting parts 7; and the reinforcing films 9 being formed at large widths in predetermined positions.

Figure 2:
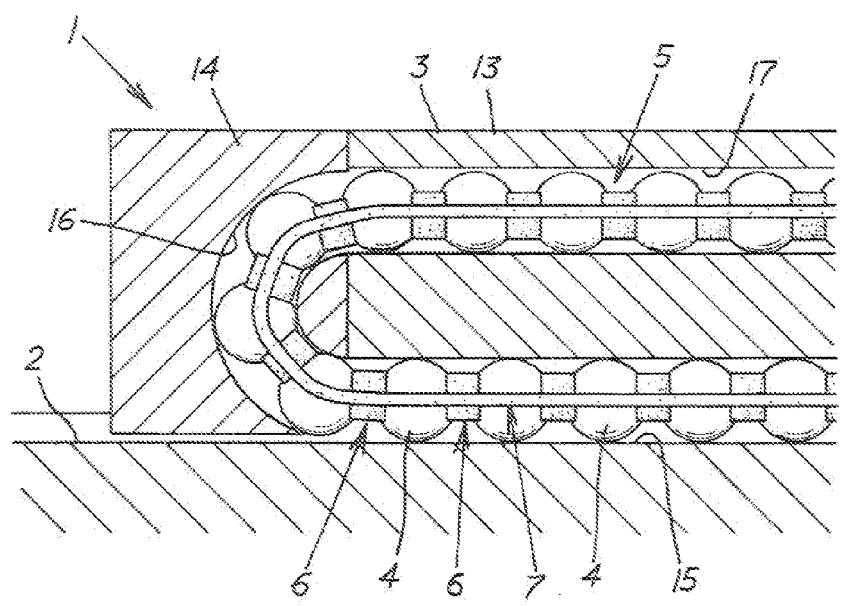
FIG. 2 is an explanatory drawing of the present example in a state of use.

Specifically, the present example is a rolling element accommodating tool placed in the endless circulation path 5 of a common linear motion device 1 comprising a rail element 2, and a block-shaped linear moving element 3 which is an upside-down U in a cross-sectional view and which has sleeve parts 13 hanging from the left and right ends of a base part (not shown) fitted onto the rail element 2, as shown in FIG. 2.

Rolling element placement grooves that form a load path 15 are formed in the opposing surfaces of the rail element 2 and (the left and right sleeve parts 13 of) the linear moving element 3, return caps 14 having return paths 16 formed therein are provided to the surfaces at the ends of the linear moving element 3 in the linear movement direction, a no-load path 17 is provided in the sleeve parts of the linear moving element 3, and the endless circulation path 5 is formed by the load path 15, the return paths 16, and the no-load path 17. In the present example, the two ends (the distal end and the rear end) are placed in the endless circulation path 5 in a state of being slightly separated and facing each other.

In the present example, the resin (base material) forming the main body and the reinforcing films 9 are formed by being integrally molded together by common insert molding (injection molding).

In the present example, the resin and the reinforcing films 9 are made from similar materials. Specifically, a polyester elastomer is used as the resin, and stretched films 9 made of polyethylene naphthalate are used as the reinforcing films 9. Therefore, the interfaces between the resin and the reinforcing films 9 are satisfactorily bonded. Films having a thickness of about 0.012 to 0.250 mm, and more preferably about 0.100 to 0.250 mm, can be used as the film-shaped reinforcing films 9.

The spacers 6 are columnar objects chamfered at one end (the surface facing the rail), and opposing surfaces between the spacers 6 are established as concavely curved surfaces. It is also acceptable to not chamfer the spacers 6.

The connecting parts 7 are belt-shaped elements linking together the ends of each of the spacers 6 in a direction orthogonal to their direction of alignment (the top and bottom ends in the present example), and the connecting part is formed integrally with the spacers 6 as described above. The inner edges 11 of the portions of the connecting parts 7 that face the rolling elements 4 are established as shapes that curve along the outer edges of the accommodated rolling elements 4.

Figure 3:
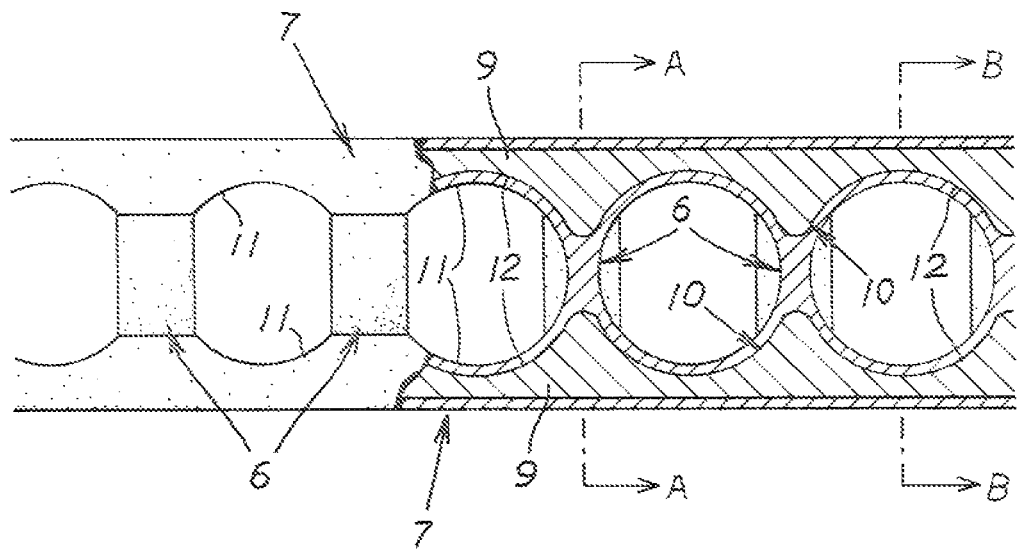
FIG. 3 is a schematic explanatory side view of the present example with a part cut out.

The reinforcing films 9, which comprising stretched films 9, are provided respectively inside the top and bottom connecting parts 7, from the distal ends substantially all the way through to the rear ends, as shown in FIG. 3. In the present example, uniaxially stretched films 9 that are stretched in the longitudinal direction are used as the stretched films 9. The stretched films 9 are contained within the main body so that the longitudinal direction of the stretched films is also the longitudinal direction of the main body. It is also acceptable to use other types of stretched films 9, such as biaxially stretched films 9 that are stretched not only in the longitudinal direction but in the width direction. The stretched films 9 are provided so that their planar direction is parallel with the vertical protruding direction of the connecting parts 7 (provided with the planar direction matching that of the main body).

The stretched films 9 are formed at large widths in the positions of the spacers 6 in the longitudinal direction of the main body, whereby concave and convex parts 10 are formed, the cross-sectional area is varied in the longitudinal direction, and the resin and the stretched films 9 are firmly bonded together by their shapes ensnaring each other.

Specifically, the stretched films 9 are formed so as to be in contact with the spacers 6 in the positions of the spacers 6 in the longitudinal direction of the main body, and more specifically so as to enter the spacers 6. Due to the stretched films 9 entering the spacers 6, twisting of the main body can be suppressed, and the main body can be prevented from rubbing against the periphery and being scratched as it moves. Another option is a configuration in which the stretched films 9 are in proximity to the spacers 6 rather than being in contact.

More specifically, the inner edges 12 of the stretched films 9 are established as concavely curved shapes along the inner edges of the connecting parts 7 in portions in the longitudinal direction of the main body that do not have the spacers 6 (the portions that have only the connecting parts 7), and in the positions of the spacers 6, the inner edges are established as convexly curved shapes as continuations of the concavely curved shapes, so as to enter the spacers 6. Therefore, smooth wavelike concave and convex parts 10 are formed in the stretched films 9 throughout the entire length in the longitudinal direction.

Figure 4:
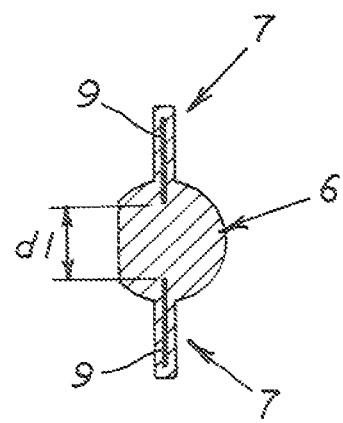
FIG. 4 is a cross-sectional view along the line A-A of FIG. 3.
Figure 5:
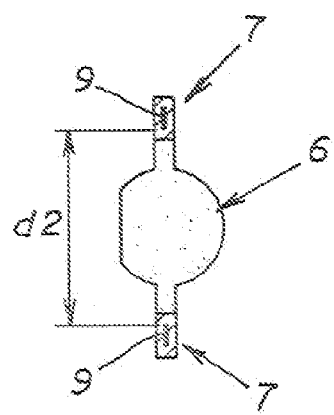
FIG. 5 is a cross-sectional view along the line B-B of FIG. 3.

The gaps between opposing inner edges of the reinforcing films 9 in a direction orthogonal to the aligned direction of the spacers 6, as shown in FIGS. 4 and 5, have a minimum value of $d_1$ and a maximum value of $d_2$. When the ratio $d_1/d_2$ is 0.85 or less, the concave and convex parts 10 satisfactorily engage with the main body (the resin), and the reinforcing films 9 are confirmed to exhibit a sufficient strengthening effect. A lesser ratio of $d_1/d_2$ (a greater difference between $d_1$ and $d_2$) is preferred if it is 0.85 or less, but taking the moldability of the main body and the stretched films into account, the lower limit of the ratio is about 0.30.

Figure 6:
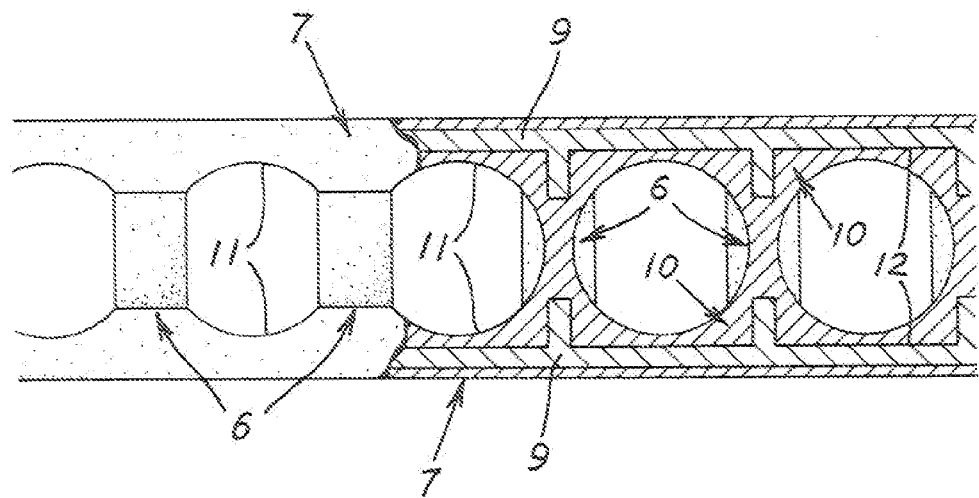
FIG. 6 is a schematic explanatory side view of another example with a part cut out.

Another optional configuration is one which the concave and convex parts 10 are formed by providing sharp projections that enter the spacers 6 in the inner edges 12 of the stretched films 9, in the positions of the spacers 6 in the longitudinal direction of the main body, as in the other example shown in FIG. 6. In the portions not containing the spacers 6 in this other example, the inner edges 12 of the stretched films 9 are not curved but are instead linear.

Because the present example is configured as described above, when the rolling elements 4 are accommodated between the spacers 6 and placed in the endless circulation path 5 of the linear motion device 1 to smoothly conduct the linear movement of the linear moving element 3, the reinforcing films 9 and the main body are firmly engaged even when the main body is subjected to tension because concavities and convexities are formed in the longitudinal direction by forming reinforcing films 9 at large widths in predetermined positions, and consequently the main body can be prevented from peeling away from the reinforcing films 9. Specifically, the tension strength of the reinforcing films 9 is satisfactorily exhibited, and tearing of the main body can be satisfactorily prevented.

This is due to the fact that the binding force between the main body and the reinforcing films 9 does not depend on the adhesive force in the interface between the main body (the resin) and the reinforcing films 9, the cross-sectional area of the reinforcing films 9 changes in the longitudinal direction, and the main body and the reinforcing films 9 are bonded together in a physically engaged relationship.

Consequently, the present example is a practical example in which the resin and the reinforcing films are firmly engaged together without compromising flexibility, and tension strength of the reinforcing films is sufficiently exhibited.

What is claimed is:

1. A rolling element accommodating tool for rotatably accommodating a plurality of rolling elements at predetermined intervals, the rolling element accommodating tool being placed along an endless circulation path along which the rolling elements circulate in a linear motion device provided with the endless circulation path and comprising a rail element and a linear moving element that moves linearly relative to the rail element; wherein the rolling element accommodating tool has a main body configured from spacers individually provided between adjacent rolling elements, and connecting parts oriented in a direction orthogonal to the direction in which the spacers are aligned, protruding on both sides of the rolling elements in a state of accommodating the rolling elements, and serially connecting the spacers; reinforcing films having the same length in the longitudinal direction as the connecting parts being contained within the connecting parts; and the reinforcing films being formed at large widths in the positions of the spacers in the longitudinal direction of the main body as compared to other portions in the longitudinal direction of the main body.

2. The rolling element accommodating tool according to claim 1, wherein the reinforcing films are configured so as to be in proximity to or in contact with the spacers in the positions of the spacers.

3. The rolling element accommodating tool according to claim 2, wherein the main body and the reinforcing films are made of a synthetic resin, and the main body and the reinforcing films are integrated by insert molding.

4. The rolling element accommodating tool according to claim 1, wherein the main body and the reinforcing films are made of a synthetic resin, and the main body and the reinforcing films are integrated by insert molding.

5. The rolling element accommodating tool according to claim 1, wherein the materials used for the main body and the reinforcing films are similar materials.

6. The rolling element accommodating tool according to claim 1, wherein the reinforcing films are stretched films that are stretched at least in the longitudinal direction, and are contained within the main body so that the longitudinal direction of the stretched films is the longitudinal direction of the main body.

7. The rolling element accommodating tool according to claim 5, wherein the reinforcing films are stretched films that are stretched at least in the longitudinal direction, and are contained within the main body so that the longitudinal direction of the stretched films is the longitudinal direction of the main body.

8. The rolling element accommodating tool according to claim 1, wherein the reinforcing films are provided so that the planar direction thereof is parallel with the protruding direction of the connecting parts.

9. The rolling element accommodating tool according to claim 1, wherein the ratio $d1/d2$ of the minimum value $d1$ to the maximum value $d2$ of the intervals between opposing inner edges of the reinforcing films is 0.85 or less.

10. The rolling element accommodating tool according to claim 1, wherein the inner edges of the connecting parts are established as shapes that curve along the shapes of the outer edges of the accommodated rolling elements, and the inner edges of the reinforcing films are established as shapes that curve along the inner edges of the connecting parts.

* * * * *